United States Patent [19]

Klein Meuleman et al.

[11] Patent Number: 4,860,035

[45] Date of Patent: Aug. 22, 1989

[54] PRINTING DEVICE HAVING A ROTATABLE IMAGE-RECEIVING SUPPORT

[75] Inventors: Peter Klein Meuleman, Venlo; Peter G. La Vos, Baarlo, both of Netherlands

[73] Assignee: Oce-Nederland B.V., Venlo, Netherlands

[21] Appl. No.: 205,389

[22] Filed: Jun. 9, 1988

[30] Foreign Application Priority Data

Jun. 12, 1987 [NL] Netherlands ........................ 8701366

[51] Int. Cl.[4] ........................................ G01D 15/00

[52] U.S. Cl. ................................ 346/157; 346/153.1

[58] Field of Search ................ 346/153.1, 157, 160.1; 355/4; 100/DIG. 1, 189, 171; 358/300; 400/114

[56] References Cited

U.S. PATENT DOCUMENTS

| | | | |
|---|---|---|---|
| 3,392,667 | 4/1979 | Cassel et al. | 346/157 |
| 4,585,319 | 3/1986 | Okamoto et al. | 346/157 |
| 4,704,621 | 11/1987 | Van Cooten et al. | 346/153.1 |
| 4,768,046 | 8/1988 | Minor et al. | 346/157 |

FOREIGN PATENT DOCUMENTS

| | | | |
|---|---|---|---|
| 0163791 | 12/1987 | European Pat. Off. | 346/157 |
| 3630349 | 3/1987 | Fed. Rep. of Germany | 346/157 |
| 58-44459 | 11/1984 | Japan | 346/157 |
| 61-65272 | 8/1986 | Japan | 346/157 |
| 1277233 | 9/1986 | United Kingdom | 346/157 |

OTHER PUBLICATIONS

Abstract of Japanese Application 60-209777, Mar. 22, 1986.

Abstract of Japanese Application 59-129888, Nov. 28, 1984.

*Primary Examiner*—Arthur G. Evans

*Attorney, Agent, or Firm*—Reed Smith Shaw & McClay

[57] ABSTRACT

An improved printing device is provided with a rotatable, cylindrical image-receiving support having a number of image-forming stations disposed along the rotational path of the image-receiving support. In each image-forming station a separation image of a required image is generated and transferred in correct registration to the image-receiving support at an image-transfer zone. Preferably, each image-forming station has a rotatable, cylindrical image-registration element and an imaging means for forming the separation image on the image-registration element. When measured along the circumference of the image-registration element in the direction of movement thereof, there is an equal distance in each image-forming station between the place where the separation image is formed on the image-registration element and the center of the image-transfer zone where the separation image is transferred to the image-receiving support.

11 Claims, 1 Drawing Sheet

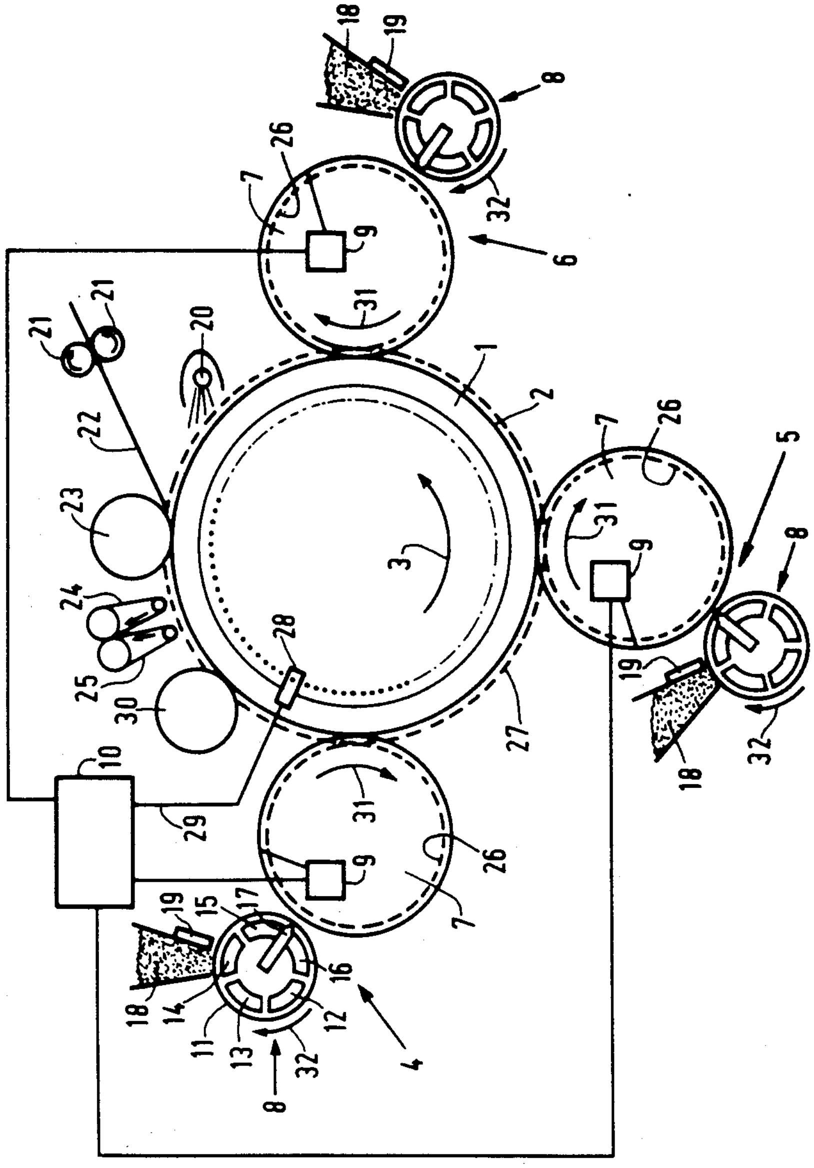
1
2
3
4
5
6
7
8
9
10
11
12
13
14
15
16
17
18
19
20
21
22
23
24
25
26
27
28
29
30
31
32

PRINTING DEVICE HAVING A ROTATABLE IMAGE-RECEIVING SUPPORT

FIELD OF THE INVENTION

The present invention relates to a printing device with a rotatable image-receiving support which has a number of image-forming stations disposed along the rotational path of the image-receiving support.

BACKGROUND OF THE INVENTION

Japanese Patent Application No. 58-44459 shows a printing device having a rotatable image-receiving support and a number of image-forming stations disposed along the rotational path of the image-receiving support. Each image-forming station uses a rotatable, cylindrical image-registration element and an imaging means to generate a separation image of a required image and to transfer the separation image to the image-receiving support in an image-transfer zone. In this particular printing device, there is an increasing distance, in each successive image-forming station, between each place where a separation image is formed on the image-registration element and the place where that separation image is transferred to the image-receiving support. The difference in the distances of two successive image-forming stations is equal to the distance between the image-transfer zones of the image-forming stations measured along the circumference of the image-receiving support. As a result of this arrangement, the start signal for forming the separation images can be given simultaneously for all the image-forming stations. A disadvantage of this device, however, is that its various parts, and particularly the image-registration elements and the image-receiving support, must be highly accurate to obtain the necessary registration requirements in the transfer of the separation images to the image-receiving support. A similar device is shown in the Abstract of Japanese Patent Application 61-65272 (Vol. 10, No. 232, Aug. 12, 1986) except that in this device the image-forming stations each contain a different color and are used to form a polychromatic image. This device has the disadvantages inherent with having different distances between the place where the separation image is formed and the place where it is transferred to the image-receiving element for each image-forming station.

Other multi-color printing devices are known. European Patent Application No. 163,791 shows a printing device having a central cylinder and a number of image-forming stations disposed along its rotational path. A paper sheet adheres to the central cylinder and a separation color image is transferred to the paper in each station. Similarly, U.S. Patent No. 3,392,667 discloses a multi-color offset printing machine having a number of plate cylinders disposed along the rotational path of a central offset cylinder for sequentially transferring colored powdered inks from the plate cylinders to the central offset cylinder.

U.K. Patent No. 1,277,233 describes a printing device which has only one image-forming station for forming the different separation images. The various separation images are produced in consecutive cycles and transferred successively to the image-receiving support. Although a highly accurate registration can be obtained with this device, it has the disadvantage that the separation images are formed consecutively so that the printing process is very time-consuming. Another disadvantage of this device is that it cannot print images which are longer than the circumference of the image-receiving support.

Other elements of a printing device are shown in the Abstract of Japanese Patent Application 60-209777 (Vol. 10, No. 72, Mar. 22, 1986); the Abstract of Japanese Patent Application 59-129888 (Vol. 8, No. 259, Nov. 28, 1984); and U.S. Patent No. 4,585,319. None of these references discloses a printing device having several image-forming stations disposed around a central image-receiving cylinder.

It would be desirable, therefore, to develop an improved printing device having a rotatable image-receiving support and a number of image-forming stations disposed around the image-receiving support which obviated the disadvantages mentioned above.

SUMMARY OF THE INVENTION

Generally the present invention provides an improved printing device with an image-receiving support in the form of a rotatable cylinder and having a number of image-forming stations disposed along the rotational path of the image-receiving support. In each image-forming station a separation image of a required image is generated and transferred in correct registration to the image-receiving support at an image-transfer zone. Each image-forming station preferably comprises a rotatable, cylindrical image-registration element and an imaging means for forming the separation image on the image-registration element.

The imaging means in each image-forming station is disposed with respect to the image-registration element such that there is an equal distance in each image-forming station, when measured along the circumference of the image-registration element and in the direction of movement thereof, between the place where the separation image is formed on the image-registration element and the center of the image-transfer zone where the separation image is transferred to the image-receiving support. Additionally, a control means is provided for deriving the starting time of the formation of the separation image in each image-forming station. The starting time is derived from the position of the image-receiving support with respect to that image-forming station to ensure proper image registration.

In the present invention, a high degree of accuracy in registration is obtained during the transfer of the separation images to the image-receiving support, while at the same time printing occurs rapidly. Also, the present device can print images which are longer than the circumference of the image-receiving support. With the present invention, inaccuracies in the shape of the image-receiving support do not affect its registration accuracy and the image-registration elements do not need to satisfy any extreme requirements with respect to the accuracy of their shape. The normal tolerance range required for these components is quite acceptable.

In practice, another advantage of the printing device according to the present invention is that its registration accuracy is independent of: (1) the location of the imaging means around the image-receiving support; (2) the relationship between the diameter of the image-receiving support and the diameters of the image-registration elements; and (3) the mutual relationships between the diameters of the image-registration elements. As a result, there is a wide variety of design choices available for the construction of a printing device according to the present invention.

In one embodiment of the present invention having a simple construction, the cylindrical image-registration elements all have the same diameter, are all driven at the same circumferential speed and the signals for controlling the imaging means are generated by a pulse transmitter connected to the image-receiving support.

In another embodiment of the present invention, each image-registration element is driven by a first gearwheel which is directly coupled to a second gearwheel on the shaft of the image-receiving support. The first gearwheels connected to the image-registration elements are so secured that the tooth having the largest eccentricity in each of the first gearwheels occupies the same position with respect to the second gearwheel on the shaft of the image-receiving support. This helps to provide the improvement in the registration accuracy.

In yet another embodiment, obtained by modifying the last embodiment, the image-registration elements are in pressure contact with the image-receiving support and the transmission ratio in the drive means between the image-receiving support and at least one image-registration element is somewhat greater than the transmission ratio which would occur if that image-registration element was driven solely by friction as a result of the pressure contact with the image-receiving support. As a result, the same first gearwheel always operates as the driving gearwheel, thereby eliminating speed variation due to tooth clearance with the second gearwheel.

Other details, objects and advantages of the present invention will become more readily apparent from the following description of a presently preferred embodiment thereof.

BRIEF DESCRIPTION OF THE DRAWING

In the accompanying drawing, a preferred embodiment of the present invention is illustrated, by way of example only, wherein:

FIG. 1 diagrammatically illustrates a printing device according to the present invention.

DESCRIPTION OF THE PREFERRED EMBODIMENT

The printing device as shown in FIG. 1 comprises a cylindrical image-receiving support 1, the metal sleeve (e.g. aluminum) of which is coated with a layer of silicone rubber 2. Image-receiving support 1 can be driven in the direction of arrow 3 by a drive means (not shown). Image-forming stations 4, 5 and 6 are disposed along the path of rotation of image-receiving support 1. Each of these image-forming stations comprises a cylindrical image-registration element 7 and an imaging means 8 for forming a separation image on image-registration element 7. Preferably, image-registration elements 7 all have the same diameter, within ±0.1 mm, and are all in pressure contact with image-receiving support 1 such that the pressure in the three pressure zones is substantially the same, and causes a separation image formed thereon to be transferred to the silicone rubber surface 2 of image-receiving support 1.

Preferably, each image-registration element 7 consists of a cylinder having an insulating surface layer on which a large number of electrodes are disposed, the electrodes being insulated from one another and extending in the circumferential direction of the cylinder as endless paths having a parallel relationship. A thin, closed, dielectric top layer is applied over the electrodes and the parts of the insulating layer situated therebetween. All the electrodes are connected via perforations in the cylinder wall to an electronic circuit 9 mounted inside the cylinder for supplying a voltage to the electrodes in accordance with the information pattern to be printed. Electronic circuit 9 in each image-registration element 7 is in turn connected to a central control unit 10 which feeds to each electronic circuit 9 in a line-by-line fashion the information concerning the separation image which is to be printed thereby.

Each imaging means 8 comprises a magnetic roller disposed at a small distance, such as ±0.2 mm, from the circumference of image-registration element 7, the magnetic roller having a rotatable sleeve 11 of electrically conductive diamagnetic material such as copper. A stationary magnetic system is disposed inside the sleeve 11 and consists of a plurality of magnets 12, 13, 14, 15, 16 and a soft-iron blade 17 clamped between like poles of magnets 15 and 16. The point of soft-iron blade 17 is located at the place where there is the minimum distance between sleeve 11 and the surface of image-registration element 7. This place is the location where the separation image is formed on image-registration element 7. Image-registration elements and imaging means as described above are shown in greater detail in U.S. Patent No. 4,704,621 which is incorporated and made a part hereof by reference as if fully set forth herein.

When considered along the circumference of element 7 in the direction of rotation, the distance between the place where the separation image is formed on the image-registration element (i.e. the place on the image-registration element situated opposite the point of soft-iron blade 17) and the center of the pressure contact zone between image-registration element 7 and image-receiving support 1 is the same in all the image-forming stations.

At sleeve 11 of each magnetic roller there is disposed a reservoir 18 filled with electrically conductive, magnetically attractable toner powder. A stripper 19 is provided at each reservoir 18 to ensure that an even layer of toner powder is applied to sleeve 11 of the magnetic roller. Also disposed along the rotational path of image-receiving support 1 are: a radiant heater 20; a means for supplying a sheet of image-receiving material, preferably consisting of cooperating conveyor rollers 21 and a guide plate 22; a pressure roller 23; a discharge means for the sheet of image-receiving material, preferably consisting of cooperating conveyor belts 24 and 25; and a cleaning device 30.

In one embodiment, each image-registration element 7 is driven by a first gearwheel 26, mounted on the rotational shaft thereof, which engages a second gearwheel 27 secured to the driven shaft of image-receiving support 1. First gearwheel 26 and second gearwheel 27 are shown in FIG. 1 in the form of interrupted circles which also indicate the pitch circle of each gearwheel. Preferably, the first gearwheels 26 are so mounted that the tooth having the largest eccentricity in each first gearwheel 26 occupies the same position with respect to second gearwheel 27 so that these teeth always engage identically in gearwheel 27. The transmission ratio between second gearwheel 27 and first gearwheel 26 is selected so that it is somewhat greater than the transmission ratio that would occur if image-registration elements 7 were driven only by friction as a result of the pressure contact with image-receiving support 1. This somewhat greater transmission ratio is obtained by making the diameter of the pitch circle of second gearwheel 27 slightly larger than the outside diameter of image-receiving support 1, and making the diameter of the pitch circle of first gearwheels 26 slightly smaller than the outside diameter of image-registration elements 7. For example, in one embodiment the diameter of image-receiving support 1 and image-registration elements 7 are 269 mm and 177 mm, respectively, and the diameter of the pitch circles of first gearwheels 26 and second gearwheel 27 are 176 mm and 270 mm, respectively.

A pulse transmitter 28 is connected to image-receiving support 1 and generates pulses in relation to the angular rotation of image-receiving support 1. Preferably, the angular rotation between consecutive pulses corresponds to a movement of the surface of image-receiving support 1 over the width of one image line. The recording of the consecutive image lines on image-registration elements 7 by imaging means 8 can thus be controlled by control unit 10 by means of the pulses which are delivered by pulse generator 28 and are fed to control unit 10 via connection 29.

When the printing device is in operation, image-receiving support 1, image-registration elements 7 and sleeves 11 of imaging means 8 are driven in the direction indicated by arrows 3, 31 and 32. Sleeves 11 are provided with a thin, even layer of toner powder. In the zone between each sleeve 11 and its corresponding image-registration element 7, a compact toner brush is formed at soft-iron blade 17 as a result of the strong magnetic field emerging there and comes into contact with image-registration element 7. If no voltage is applied to the electrodes beneath the surface of image-registration elements 7, then no toner powder is deposited on the image-registration elements. By the selective application of a voltage to the electrodes in accordance with an image pattern, a toner powder image pattern is formed on image-registration elements 7.

The information concerning the image lines of the various separation images which are to be recorded is fed serially, line by line to a shift register in each of electronic circuits 9 by control unit 10. On the subsequent reception of the next pulse from pulse generator 28, the information stored in the shift register of first image-forming station 4 is transferred to an output register and certain electrodes receive voltage via drivers in accordance with the image line which is to be recorded. In the meantime, the shift register is filled with the information for the next image line. On reception of the next pulse from pulse generator 28, this image line is transferred to image-registration element 7. On reception of a given pulse from pulse generator 28, imaging means 8 of the second image-forming station 5 is activated, and a number of pulses thereafter imaging means 8 of the next image-forming station is activated. The number of pulses after which the imaging means of the second and the next image-forming station or stations are activated is predetermined by the circumferential distance of image-receiving support 1 between the image-forming stations. The correct number of pulses is fixed in a control program which is stored in a memory of control unit 10.

The separation images formed on image-registration elements 7 are transferred to image-receiving support 1 in proper registration in the various pressure contact zones. Image-receiving support 1 which is now provided with the proper powder image, then passes through a heating zone where the powder image is softened by radiant heater 20. The softened powder image is transferred to an image-receiving material such as a sheet of paper in the pressure zone between image-receiving support 1 and pressure roller 23 once the image-receiving material has been fed via feed means 21 and 22 at the correct time. The printed image-receiving material is discharged by cooperating conveyor belts 24 and 25 and then image-receiving support 1 moves past cleaning device 30.

Various modifications to the above-described invention are possible by one skilled in the art. For example, a toothed belt, a chain drive or a drive using friction rollers can be used instead of the gearwheel drive having directly coupled first and second gearwheels. The gearwheel drive shown in FIG. 1 is presently preferred because of the simplicity of its construction and its increased accuracy and durability in comparison particularly with a drive using friction rollers.

Preferably, image-registration elements 7 are mounted in the printing device in a known manner such that when the printing device is switched off or is in the standby position, these elements are released from image-receiving support 1, but first gearwheels 26 and second gearwheels 27 continue to be engaged to maintain the correct positioning of first gearwheels 26 with respect to second gearwheel 27. When an image is required to be printed, image-registration elements 7 are again brought into pressure contact with image-receiving support 1. Either all of the image-registration elements 7 can be pressed into contact at one time or only those which are required to come into operation for forming a particular image.

Instead of using image-registration elements 7 which all have the same diameter, it is possible to use image-registration elements having different diameters which are driven at the same circumferential speed. In this case, however, there must still be the same distance along the circumference of each image-registration element and in the direction of its movement, between the place where the image is formed on the image-registration element and the center of the image-transfer zone, for each of the image-forming stations.

The time at which image formation is to be started at each imaging station can also be determined by means of detectors disposed along the path of rotation of imaging-receiving support 1, such detectors detecting a marking on image-receiving support 1. Recording of the consecutive image lines can then be further controlled by means of pulses generated by pulse generators connected to each rotating image-registration element. Other known imaging means can also be used instead of the imaging means shown in FIG. 1. For example, it is possible to use an electrode system which applies an electrostatic charge pattern to the image-registration elements and then develop it with toner powder to form a toner image rather than the magnetic system shown in FIG. 1.

When the printing device is in operation for a relatively long period, the image registration in the direction perpendicular to the direction of conveyance may become less accurate due to a difference in thermal expansion of image-registration elements caused by an unequal heating of the image-registration elements by radiant heater 20. To obviate this registration error, the printing device can be provided with a temperature control which prevents an excessive temperature difference between image-registration elements 7 or eliminates the difference if it occurs. Preferably, the temperature control comprises a plurality of temperature sensors which measure the temperature of each image-registration element and a measuring and control unit which determines the temperature difference between the hottest and coldest image-registration elements and compares that difference with a reference value. If the difference is greater than the reference value, the temperature of the image-registration elements is modified to bring the difference beneath the reference value. To control the temperature of the image-registration elements, a plurality of cooling means are provided, for example, whose cooling intensity can be varied separately for each image-registration element. For example, each image-registration element can be provided with a fan either with an infinitely variable speed or a fixed speed which can be switched on when the associated image-registration element requires cooling.

The temperature control, preferably is carried out by bringing the temperature of excessively hot image-registration elements back to the lowest measured temperature value. It is also possible to provide an inhibit circuit which releases the start of a printing process only if the temperature difference between the image-registration elements is below the reference value.

While a presently preferred embodiment of practicing the invention has been shown and described with particularity in connection with the accompanying drawing, the invention may otherwise be embodied within the scope of the following claims.

What is claimed is:

1. In a printing device having an image-receiving support in the form of a rotatable cylinder and having a number of image-forming stations disposed along the rotational path of the image-receiving support, wherein a separation image of a required image is generated and transferred to the image-receiving support at an image-transfer zone, each image-forming station comprising a rotatable cylindrical image-registration element and an imaging means for forming the separation image on the image-registration element, the improvement comprising: the imaging means being disposed with respect to the image-registration element each such that there is an equal distance in each image-forming station, along the circumference of the image-registration element in the direction of its movement, between the place where the separation image is formed on the image-registration element and the center of the image-transfer zone between the image-registration element and the image-receiving support; and a control means for deriving the start time of image formation in each image-forming station from the position of the image-receiving support with respect to that image-forming station to ensure proper registration.

2. A printing device as described in claim 1 wherein all the cylindrical image-registration elements have the same diameter and are driven at the same circumferential speed.

3. A printing device as described in claim 1 wherein the control means comprises a pulse generator connected to the image-receiving support to generate signals for controlling the imaging means.

4. A printing device as described in claim 1, wherein each image-registration element is connected to and driven by a first gearwheel which is directly coupled to a second gearwheel connected to the image-receiving support.

5. A printing device as described in claim 4 wherein the first gearwheels which are coupled to the image-registration elements are so secured that a tooth having the largest eccentricity in each of the first gearwheels occupies the same position with respect to the second gearwheel of the image-receiving support.

6. A printing device as described in claim 3, wherein each image-registration element is connected to and driven by a first gearwheel which is directly coupled to a second gearwheel connected to the image-receiving support.

7. A printing device as described in claim 6 wherein the first gearwheels which are coupled to the image-registration elements are so secured that a tooth having the largest eccentricity in each of the first gearwheels occupies the same position with respect to the second gearwheel of the image-receiving support.

8. A printing device as described in claim 1, wherein the image-registration elements are in pressure contact with the image-receiving support and the transmission ratio in a drive means between the image-receiving support and at least one image-registration element is somewhat greater than the transmission ratio which would occur if that image-registration element was driven solely by friction as a result of the pressure contact with the image-receiving support.

9. A printing device as described in claim 3 wherein the image-registration elements are in pressure contact with the image-receiving support and the transmission ratio in a drive means between the imagine-receiving support and at least one image-registration element is somewhat greater than the transmission ratio which would occur if that image-registration element was driven solely by friction as a result of the pressure contact with the image-receiving support.

10. In a printing device with an image-receiving support in the form of a rotatable cylinder having a number of image-forming stations disposed along the path of rotation of the image-receiving support; each image-forming station comprising an image-registration element on which a separation image of a required image is generated, a transfer zone wherein the separation image is transferred to the image-receiving support, and a means for transferring an image from the image-receiving support to a receiving material and fixing it; the improvement comprising providing temperature sensors to measure the temperature of each image-registration element and providing a means for determining the largest temperature difference between the image-registration elements, comparing that difference with a reference value, and controlling the temperature of the image-registration elements and to maintain their temperature at a level wherein the difference is lower than the reference value.

11. A printing device as described in claim 10, wherein the means for controlling the temperature of the image-registration elements comprises a cooling means, the cooling intensity of which is separately controllable for each image-registration element.

* * * * *